G. W. & J. C. GEISENDORFF.
Car-Axle Box.
No. 420.
Reissued Jan. 13, 1857.
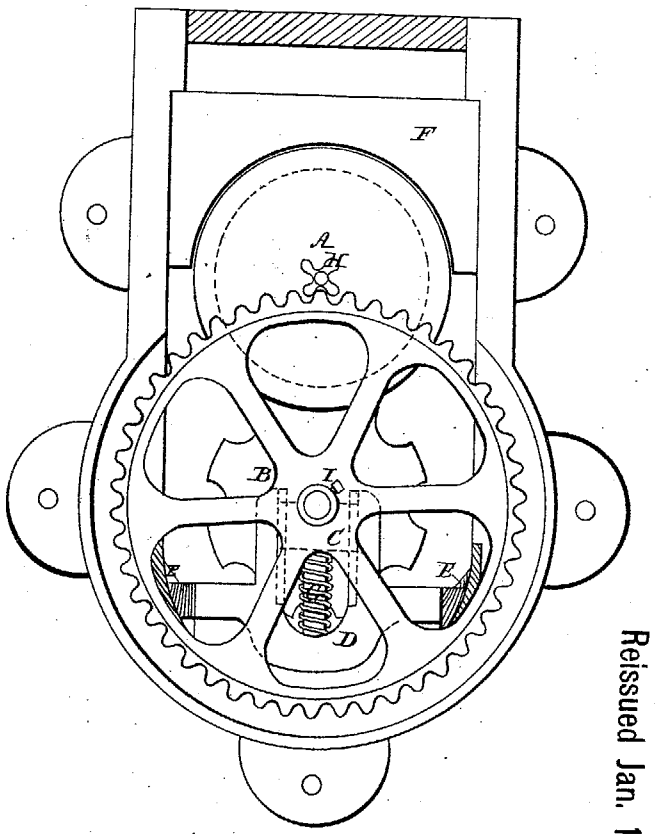
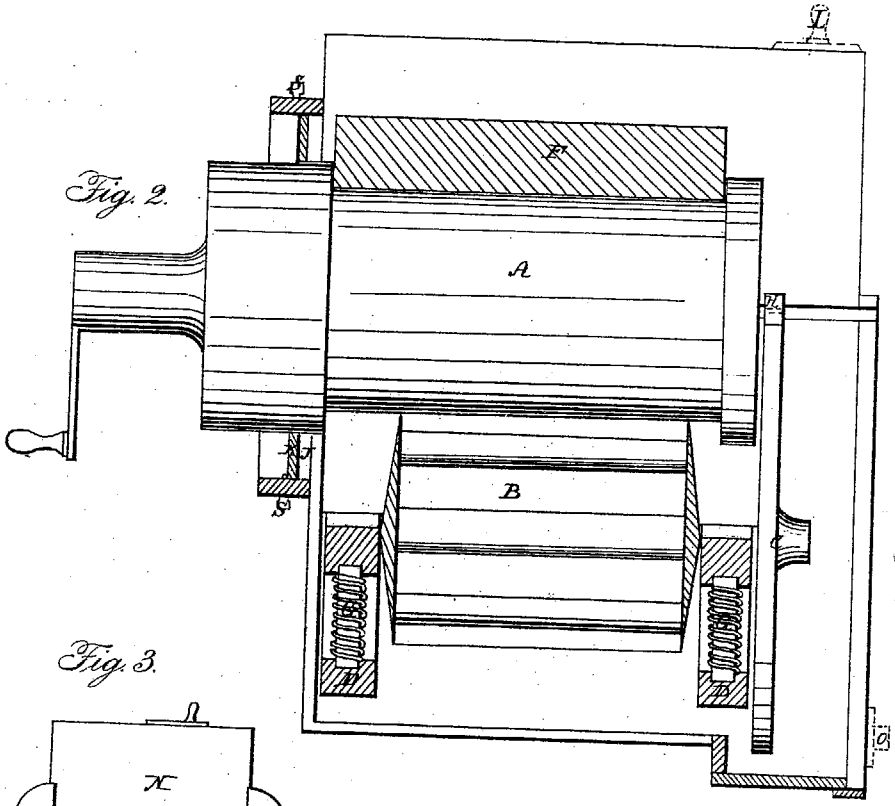
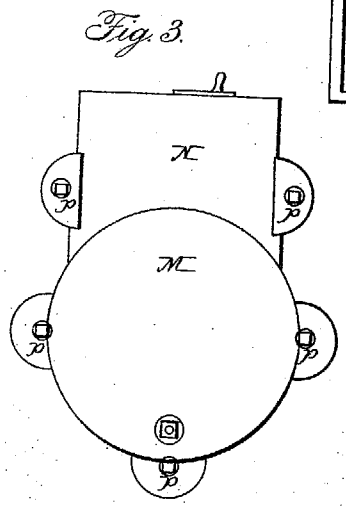
AM. PHOTO-LITHO. CO. N.Y. (OSBORNE'S PROCESS.)

UNITED STATES PATENT OFFICE.

G. W. GEISENDORFF AND J. C. GEISENDORFF, OF CINCINNATI, OHIO.

IMPROVEMENT IN AXLE-BOX ROLLERS.

Specification forming part of Letters Patent No. 12,347, dated February 6, 1855; Reissue No. 420, dated January 13, 1857.

*To all whom it may concern:*

Be it known that we, GEORGE W. GEISENDORFF, of Indianapolis, in the county of Marion and State of Indiana, and JACOB C. GEISENDORFF, of Cincinnati, in the county of Hamilton and State of Ohio, have invented certain new and useful Improvements in Lubricators for Railroad-Car Axles; and we do hereby declare that the following is a full, clear, and exact description thereof, reference being had to the accompanying drawings, making a part of this specification.

The nature of our improvement in lubricators is to furnish the material now commonly used for that purpose—viz., dubbing, a mixture composed of oil and tallow—with freedom and with certainty to the journals, not only when said material is rendered fluid by the heating of the axle, but to accomplish a more desirable object—viz., its application thereto when rendered solid by the state of the weather, or at the moment of starting the cars after a continuous rest. We also, by our mode of construction, prevent any loss of the lubricating material when fluid by an overflow of the oil-box, one of the evils consequent to the usual form. We are enabled to dispense entirely with wool or cotton waste commonly employed, and therefore have no rolling of the same arising from a dry box or the lifting of gritty or filthy fluid deposited in the bottom of the oil-box. All of these desirable results we accomplish by giving a positive motion to the lubricating-roller through the agency of cog-gear or similar means. One or two of those means we will hereinafter describe.

We are well aware that journals have been lubricated by rollers in contact with and operated on their peripheries by the journal; but such devices might serve the purpose when oils are used and those oils capable of retaining their fluidity in cold weather, but they by no means afford a sure and positive mode of lubricating when solid dubbing is used or extreme cold weather ensues. The roller or lubricator being embedded in the lubricating material, it is arrested and held firm until the mass is melted by the action and friction of a dry journal, causing it to heat, and thus melt, the material.

Figure 1 is an end view of the lubricator and box-case; Fig. 2, a section through the center longitudinally.

A in Figs. 1 and 2 represents the journal of the axle; B, the lubricating-roller, which, we would state, may be made either a plain or a fluted cylinder, and covered with cloth or other absorbent substance that will retain the oil and carry it up and deliver it to the journal as it revolves.

D is a sliding frame for sustaining the roller, and admits of being taken out of the box-case when necessary.

H is a small pinion secured to the end of the car-axle and revolves with it. *c* is a cog-wheel meshing with the pinion and driven by it. A set-screw, I, fastens the cog-wheel *c* on the shaft, carrying the lubricator-roller B. The box or bearing of the axle of roller B is pressed upward by a helical spring, G, and thus presses the lubricating-roller against the journal of the axle.

F is the ordinary metal box resting on the journal of the axle.

O is a tap-screw at the bottom of the cap to let out oil unfit for use.

L is a slide on the top of the box-case to close the oil-hole.

J is a leather washer on the axle.

K is a brass washer that secures the leather washer to the box by screws.

Fig. 3 represents the front of the box-case closed with caps N and M by the screw-bolts P P P.

Another mode of giving a positive movement to the lubricating-roller, one of the "similar means," we would describe as follows:

In place of the pinion H, (described,) we employ an endless screw, either cut on a reduced portion of the car-axle, or we chase a screw on the collar thereof. At the side of this screw we place an upright shaft, carrying near its upper end a pinion that meshes in the screw. On the lower end of this shaft we secure a second endless screw, which meshes with a pinion fastened on the shaft of the lubricating-roller described in foregoing specification. The shaft of the lubricating-roller is supported by a spring under its box, as in the first description, and the upper end of the upright shaft is also pressed toward the screw on the car-axle to keep it in mesh. This latter mode of gearing is much more circumscribed in space, and can be employed in box cases of the ordinary form and size.

We are aware that it is not new to give motion to the lubricating-roller by mere contact of said roller with the journal of the axle; but, Having described our improvement, what we claim as our invention, and desire to secure by Letters Patent, is—

Giving a positive motion or rotation to the lubricating-roller by the axle of the car-wheel in the manner set forth.

In testimony whereof we have signed our names before two subscribing witnesses.

G. W. GEISENDORFF.
I. C. GEISENDORFF.

Witnesses:
ISAAC THALMAN,
JOHN W. TEAL.